US012707360B2

(12) United States Patent
Yan et al.

(10) Patent No.: US 12,707,360 B2
(45) Date of Patent: Aug. 11, 2026

(54) TRANSMISSION SWITCHING ON MULTIPLE CARRIERS IN IOT NTN

(71) Applicant: Lenovo (Beijing) Limited, Beijing (CN)

(72) Inventors: Zhi Yan, Beijing (CN); Hongmei Liu, Beijing (CN); Yuantao Zhang, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 335 days.

(21) Appl. No.: 18/290,483

(22) PCT Filed: May 14, 2021

(86) PCT No.: PCT/CN2021/093781
§ 371 (c)(1),
(2) Date: Nov. 14, 2023

(87) PCT Pub. No.: WO2022/236801
PCT Pub. Date: Nov. 17, 2022

(65) Prior Publication Data
US 2024/0251315 A1 Jul. 25, 2024

(51) Int. Cl.
*H04W 36/18* (2009.01)
*H04B 7/185* (2006.01)
*H04B 7/204* (2006.01)

(52) U.S. Cl.
CPC ........ *H04W 36/18* (2013.01); *H04B 7/18513* (2013.01); *H04B 7/18519* (2013.01); *H04B 7/2041* (2013.01)

(58) Field of Classification Search
CPC ............ H04B 7/18519; H04B 7/18513; H04B 7/2041; H04W 36/18; H04L 5/14
See application file for complete search history.

(56) References Cited

U.S. PATENT DOCUMENTS 11,082,903 B2 * 8/2021 Yun .................... H04B 7/18541
2020/0136720 A1 4/2020 Miller
2020/0313817 A1 * 10/2020 Xu ...................... H04L 27/2605
2021/0006328 A1 * 1/2021 Kim ...................... H04W 72/23
2022/0007323 A1 * 1/2022 Li ........................ H04B 7/1851
2022/0053522 A1 * 2/2022 MolavianJazi ... H04W 72/0453
2022/0321206 A1 * 10/2022 Shrestha ............ H04W 64/003
2022/0322414 A1 * 10/2022 Khoshkholgh Dashtaki .............. H04W 72/21
2022/0352958 A1 * 11/2022 Zhang ................. H04B 7/0695
(Continued)

FOREIGN PATENT DOCUMENTS

EP 3817486 A1 5/2021
WO 2020069740 A1 4/2020

OTHER PUBLICATIONS

Mediatek Inc. , “Summary #1 of 8.4.4 Other Aspects of NR-NTN”, 3GPP TSG RAN WG1 Meeting #103e, R1-200XXXX [retrieved Dec. 15, 2023]., Oct. 2020, 33 pages.
(Continued)

*Primary Examiner* — Bailor C Hsu
(74) *Attorney, Agent, or Firm* — FIG. 1 Patents

(57) ABSTRACT

Methods and apparatuses for transmission switching on multiple carriers in IoT NTN are disclosed. A method comprises receiving a resource configuration: and transmitting UL signal on a physical resource determined by the resource configuration.

20 Claims, 5 Drawing Sheets

(56) References Cited

U.S. PATENT DOCUMENTS

2023/0099762 A1* 3/2023 Khoshkholgh Dashtaki ............... H04W 56/001 370/350
2024/0097780 A1* 3/2024 Ji ....................... H04B 7/18591
2024/0162978 A1* 5/2024 Cheema ................ H04W 36/12

OTHER PUBLICATIONS

PCT/CN2021/093781 , "International Preliminary Report on Patentability", PCT Application No. PCT/CN2021/093781, Nov. 23, 2023, 4 pages.
PCT/CN2021/093781 , "International Search Report and Written Opinion", PCT Application No. PCT/CN2021/093781, Jan. 30, 2022, 6 pages.

* cited by examiner

TRANSMISSION SWITCHING ON MULTIPLE CARRIERS IN IOT NTN

FIELD

The subject matter disclosed herein generally relates to wireless communications, and more particularly relates to methods and apparatuses for transmission switching on multiple carriers in IoT NTN.

BACKGROUND

The following abbreviations are herewith defined, at least some of which are referred to within the following description: New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/Equipment (Mobile Terminal, UE), Transmitter (TX), Receiver (RX), Internet of Things (IOT), Narrow Band Internet of Things (NBIOT), Narrowband Physical uplink shared channel (NPUSCH), Timing Advance (TA), enhanced Machine Type Communication (eMTC), Non-Terrestrial Network (NTN), low earth orbit (LEO), Evolved Universal Terrestrial Radio Access (E-UTRA), E-UTRA Absolute Radio Frequency Channel Number (EARFCN), timing offset (TO), system information block (SIB), system frame number (SFN), Global Navigation Satellite System (GNSS).

For NBIoT NPUSCH, resource units are used to describe the mapping of the NPUSCH to resource elements. Each NPUSCH codeword can be mapped to one or multiple resource units $N_{RU}$, each of which shall be transmitted $N_{rep}$ times. $N_{RU}$ can be configured up to 10 while $N_{rep}$ can be configured up to 128 for NPUSCH format 1. As a whole, one NPUSCH codeword transmission may span up to 40 seconds. During one NPUSCH transmission, time synchronization and frequency synchronization are maintained, which means that UE will not update TA and/or frequency synchronization during one NPUSCH transmission.

On the other hand, in NBIoT or eMTC in NTN (i.e. over satellite), the one NPUSCH codeword transmission (e.g. up to 40 seconds) may be longer than the time duration (e.g. about 7 seconds for high speed LEO satellite with earth moving cells) before the UE needs to handover or perform a cell reselection, resulting that the UE cannot complete all repetitions before the change of cell or change of serving satellites.

This disclosure targets solving the above-described problem.

BRIEF SUMMARY

Methods and apparatuses for transmission switching on multiple carriers in IoT NTN are disclosed.

In one embodiment, a method comprises receiving a resource configuration; and transmitting UL signal on a physical resource determined by the resource configuration.

In one embodiment, the resource configuration includes multiple carrier configurations, in which each carrier configuration includes at least one of a carrier ID, a beam ID, and a frequency position. Each carrier configuration may further include one or more satellite configurations. Each satellite configuration includes satellite ID, satellite ephemeris, satellite activation timer (P) to a reference time, satellite activation duration (T), satellite initial TO, and TO drift rate. Alternatively, each carrier configuration is associated with a carrier activation starting time (Ts) and a carrier activation duration (N0), and the carrier activation starting time is determined by a carrier activation period (T) and a carrier activation time offset ($T_{offset}$).

In some embodiment, the activated physical resource that has the longest remaining satellite activation duration (T) or carrier activation duration (N0) among multiple activated physical resources is determined as the physical resource. Alternatively, he activated physical resource that has the lowest or the highest carrier index, beam index or satellite index among multiple activated physical resources is determined as the physical resource.

In some embodiment, a transmission gap is inserted in response to the determined physical resource switching. The transmission gap may start at one of the following time points: (1) a time point that is a first duration before the invalidation or expiry of a previous physical resource; (2) the time point on which the previous physical resource becomes invalid or expired; (3) a time point that is a second duration before the validation or activation of a later physical resource; and (4) the time point on which the later physical resource becomes valid or activated.

In another embodiment, the resource configuration includes multiple satellite configurations, wherein each satellite configuration includes satellite ephemeris, satellite activation timer (P) to a reference time, satellite activation duration (T), satellite initial TO, and TO drift rate, and further includes carrier configuration.

In still another embodiment, the method further comprises receiving a control signal including at least one of an order of transmission in multiple physical resources, an initial physical resource, and transmission repetition numbers in the multiple physical resources; and transmitting the UL signal on a physical resource determined by the control signal.

In one embodiment, a method comprises transmitting a resource configuration; and receiving UL signal on a physical resource determined by the resource configuration.

In another embodiment, a remote unit (UE) comprises a receiver that receives a resource configuration; and a transmitter that transmits UL signal on a physical resource determined by the resource configuration.

In yet another embodiment, a base unit comprises a transmitter that transmits a resource configuration; and a receiver that receives UL signal on a physical resource determined by the resource configuration.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
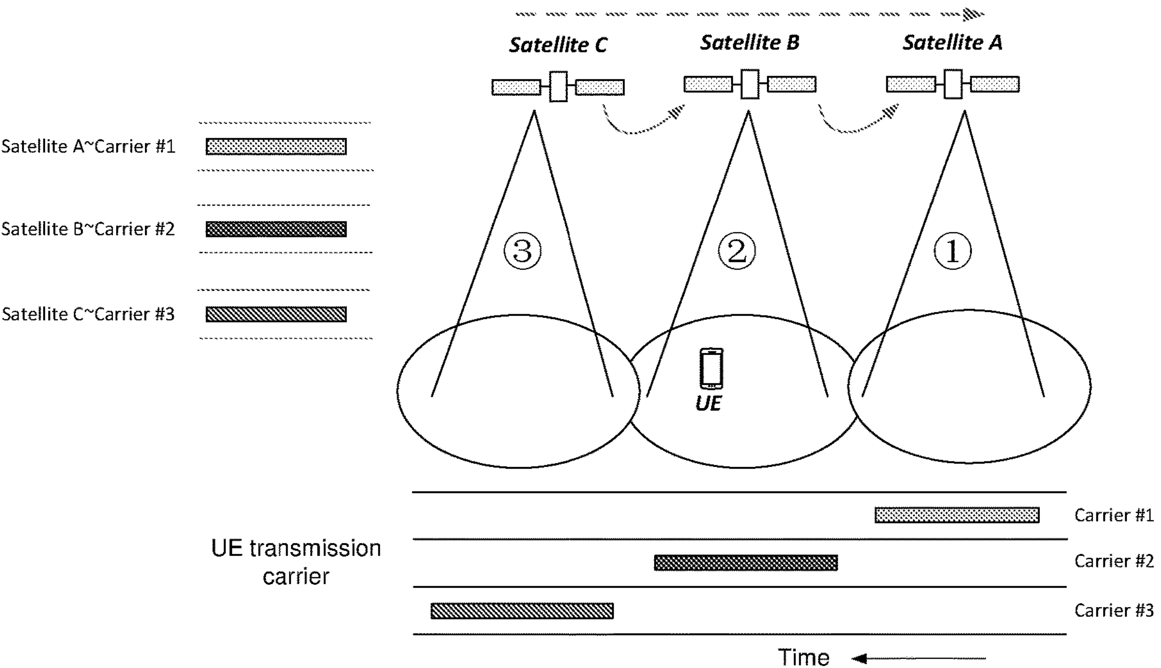
FIG. 1 illustrates satellite switching according to a first embodiment.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

As described in the background part, before the end of the NPUSCH data transmission, the cell may be changed or the serving satellite may be moved out of the coverage.

According to a first embodiment, one cell can be associated with multiple consecutive satellites in IoT NTN deployment.

For NTN uplink transmission, UE transmits uplink signal via satellite to the network (e.g. eNB) in the ground. In uplink transmission, UE can transmit uplink signal via different satellites in different carriers, i.e. each serving satellite is associated with a particular carrier. Carrier in NBIoT is the frequency band with bandwidth of 180 KHz as an example. The change of serving satellite due to satellite moving means carrier switching to the UE. As shown in FIG. 1, for UE transmission in a particular coverage in the ground, UE transmits uplink signal via Satellite A to the network in the ground in a particular time period, and the Satellite A is associated with Carrier #1, that is, UE transmits uplink signal via satellite A in Carrier #1; in another time period, UE transmits uplink signal via Satellite B to the network in the ground and Satellite B is associated with Carrier #2, that is, UE transmits uplink signal via satellite B in Carrier #2; and Satellite C is associated with Carrier #3. UE (e.g. IoT UE) can be regarded as near-static or without moving, i.e. fixed at a particular position. The satellites (e.g. Satellite A, Satellite B and Satellite C) are moving in the same direction. When the UE is in coverage of a serving satellite, the UE performs transmission in the carrier associated with the serving satellite. For example, in a particular timing, the UE, when in coverage of Satellite A, performs transmission in Carrier #1; when in coverage of Satellite B, performs transmission in Carrier #2, and when in coverage of Satellite C, performs transmission in Carrier #3. In other words, for a particular UE, in one time period, UE is in coverage of Satellite A and performs transmission in carrier 1, while in another time period that is continuous to the one time period, UE is in coverage of Satellite B and performs transmission in carrier 2, and so on. When the serving satellite of UE changes to a different satellite, the UE switches to perform transmission in the carrier associated with the different satellite. Since multiple carriers (e.g. Satellite A, Satellite B and Satellite C) are not active at the same time, the base station (e.g. eNB) can configure the active time for different carriers based on the satellite ephemeris information.

Incidentally, non-adjacent satellites can be associated with the same carrier. For example, in the example of FIG. 1, it is possible that both Satellite A and Satellite C are associated with the same carrier.

According to a second embodiment, semi-persistent transmission resource is considered. Because the satellite ephemeris and orbit are fixed or can be predicted by the base station (e.g. eNB) and the UE, and because IoT UE is near-static and without moving, it is feasible to configure semi-persistent physical transmission resources to UE.

In option 1 of the second embodiment, UE is configured with multiple UL carriers for data transmission. Each UL carrier is associated with a carrier ID, a particular beam, and a frequency position. The frequency position of each UL carrier can be defined as E-UTRA Absolute Radio Frequency Channel Number (EARFCN).

In option 1-1, each UL carrier is further associated with one or multiple satellites. Each satellite can be represented by a satellite ID, and each satellite has satellite ephemeris, a satellite activation timer (P) relative to a reference time point (e.g., subframe #0), an satellite activation duration (T), an initial TO and a TO drift rate.

The satellite ephemeris identifies the position of the satellite. The satellite can be alternatively represented by the satellite ephemeris.

The satellite activation timer (P) relates to a time period relative to a reference time point, which means that the satellite can be activated after the time period.

The satellite activation duration (T) relates to a time duration within which the satellite is activated (i.e. is able to serve the UE).

The initial TO reflects the initial time offset between the eNB and satellite.

Figure 2:
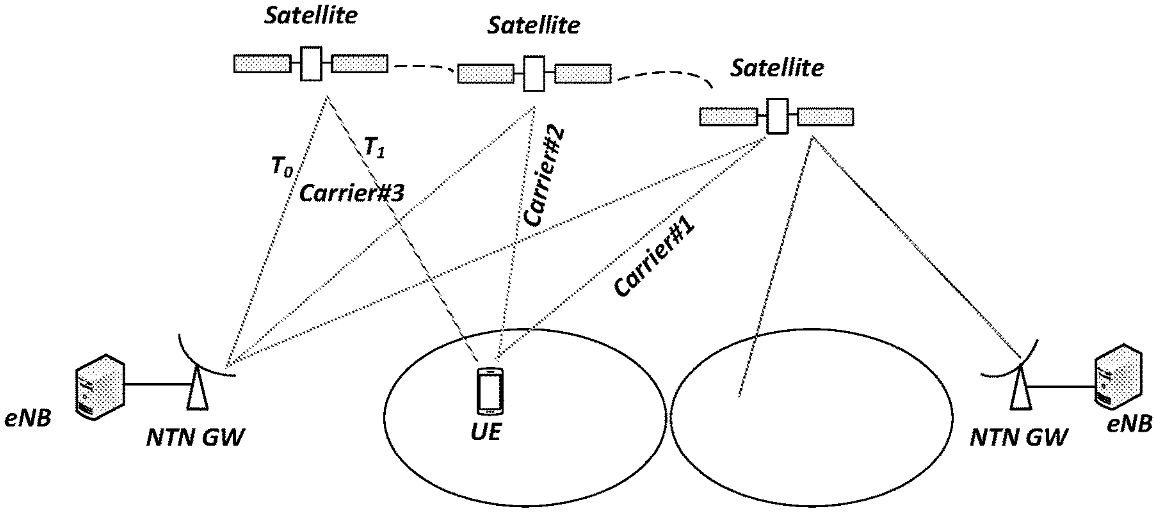
FIG. 2 illustrates timing offset (TO)

As shown in FIG. 2, the time offset $T_0$ between the eNB and the satellite is initially the initial TO. The initial TOs for different satellites can be different. The time offset $T_1$ between the satellite and the UE is estimated by the UE based on the GNSS and satellite ephemeris.

As the satellite is moving, the TO changes over time. The TO drift rate reflects the change of TO between the eNB and the satellite over time. In other words, the TO between the eNB and the satellite at any time point can be obtained according to the initial TO and the TO drift rate.

Figure 3:
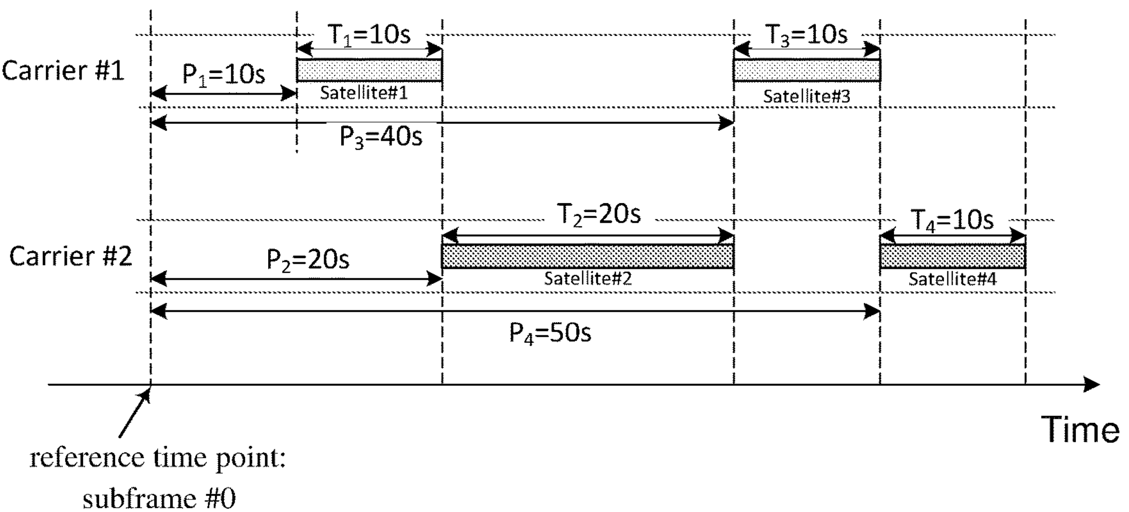
FIG. 3 illustrates an example of the resource configuration according to option 1-1 or option 2 of a second embodiment.

An example of the resource configuration according to option 1-1 of the second embodiment is illustrated in FIG. 3.

The UE is configured with two UL carriers (e.g. UL carrier #1 and UL carrier #2), each of which is associated with a carrier ID (e.g. UL carrier #1 or UL carrier #2), a particular beam (e.g., beam #1 or beam #2) and a frequency position (not shown in FIG. 3).

Each carrier is configured with one or multiple associated satellite configurations. For example, UL carrier #1 is configured with Satellite #1 and Satellite #3.

Satellite #1 is associated with satellite activation timer (P1) equal to 10 s, and satellite activation duration (T1) equal to 10 s. The satellite ephemeris (that can be in the format of satellite position and velocity state vectors), the initial TO and the TO drift rate are not shown in FIG. 3.

Satellite #3 is associated with satellite activation timer (P3) equal to 40 s, and satellite activation duration (T3) equal to 10 s.

UL carrier #2 is configured with Satellite #2 and Satellite #4.

Satellite #2 is associated with satellite activation timer (P2) equal to 20 s, and satellite activation duration (T2) equal to 20 s.

Satellite #4 is associated with satellite activation timer (P4) equal to 50 s, and satellite activation duration (T4) equal to 10 s.

The satellites that have the same or similar satellite orbit may have the same initial TO (i.e. common initial TO) and the same TO drift rate (i.e. common TO drift rate).

The resource configuration may be configured cell-specific or UE-specific. For example, before the UE transits to RRC-CONNECT state, the resource configuration may be configured cell-specific to all UEs within the serving cell (e.g. broadcasted in SIB). After the UE transfers to RRC_CONNECT state, the resource configuration or a part of the resource configuration (e.g. the frequency position) may be configured UE-specific (e.g. updated or signaled to individual UE).

In option 1-2, each UL carrier is further associated with multiple satellites. In particular, the satellites with the same or similar ephemeris are configured to the same UL carrier, which facilitates the configuration. For example, in the example of FIG. 4, Carrier #1 is associated with Satellite #1-1 and Satellite #1-2; Carrier #2 is associated with Satellite #2-1 and Satellite #2-2; and Carrier #3 is associated with Satellite #3-1 and Satellite #3-2.

The satellite activation durations of the satellites in each associated carrier are periodic (e.g. with a period of T). So, the satellite activation duration can be referred to as carrier activation duration. It means that, for example, for Carrier #1, the start time point of the carrier activation duration of a first satellite (e.g. Satellite #1-1) is $T_{1-1}$, and the start time point of the carrier activation duration of a second satellite (e.g. Satellite #1-2) is $T_{1-2}$, where $T_{1-2}-T_{1-1}=T$. Similarly, for Carrier #2, the start time point of the carrier activation duration of a first satellite (e.g. Satellite #2-1) is $T_{2-1}$, and the start time point of the carrier activation duration of a second satellite (e.g. Satellite #2-2) is $T_{2-2}$, where $T_{2-2}-T_{2-1}=T$. For Carrier #3, the start time point of the carrier activation duration of a first satellite (e.g. Satellite #3-1) is $T_{3-1}$, and the start time point of the carrier activation duration of a second satellite (e.g. Satellite #3-2) is $T_{3-2}$ where $T_{3-2}-T_{3-1}=T$.

In addition, the carrier activation durations of the satellites in each associated carrier are the same (i.e. common carrier activation duration).

Moreover, the start time point of the carrier activation duration of each carrier (e.g. T0, $T_1$, T2) satisfies (10*SFN+subframe number) modulo $T=T_{offset}$. SFN means system frame number. $T_{offset}$ means carrier activation time offset. In particular, in Carrier #1, $T_{offset}=T_{offset0}=T0=0$; in Carrier #2, $T_{offset}=T_{offset}1=T1$; and in Carrier #3, $T_{offset}=T_{offset2}=T2$.

So, UE can be configured to transmit uplink data in configured activated UL carriers in each period T (carrier activation period). During each carrier activation period (T), each carrier has a carrier activation starting time (Ts) determined by the carrier activation time offset ($T_{offset}$). In other words, the carrier activation starting time (Ts) (e.g. $T_{1-1}$ and $T_{1-2}$ for Carrier #1, $T_{2-1}$ and $T_{2-2}$ for Carrier #2, $T_{3-1}$ and $T_{3-2}$ for Carrier #3) is determined by the carrier activation period (T) and the carrier activation time offset ($T_{offset}$) (e.g. $T_{offset}$), $T_{offset1}$, $T_{offset2}$). The carrier activation duration can be referred to as N0.

Figure 4:
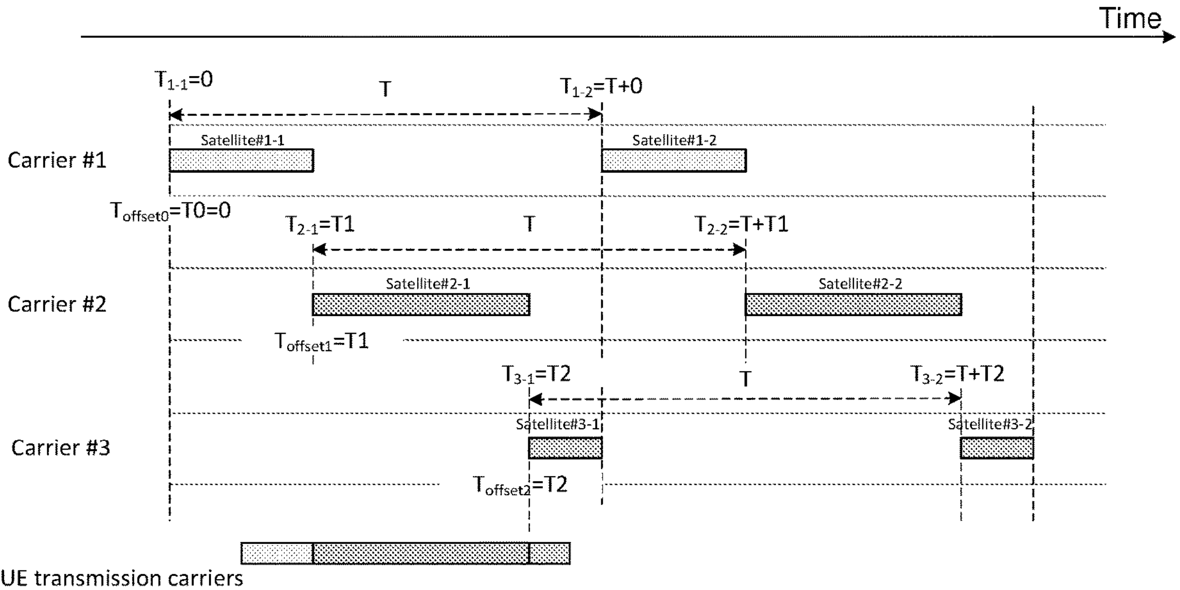
FIG. 4 illustrates an example of the resource configuration according to option 1-2 of the second embodiment.

For example, as shown in FIG. 4, in the first period T, the UE can transmit uplink data sequentially in Carrier #1, Carrier #2 and Carrier #3.

Because the satellites with the same or similar ephemeris are configured to the same UL carrier, both the initial TO and the TO drift rate can be common for all satellites associated with the same carrier (i.e. common initial TO and common TO drift).

Beam coverages (e.g. satellite coverages) overlap. So, if the UE can be served by two or more activated carriers (e.g. two or more serving satellites), eNB may indicate the carrier for data transmission in a control signal. Alternatively, the carrier for data transmission can be implicitly determined. For example, the activated carrier having the longest remaining satellite activation duration or carrier activation duration among all activated carriers can be determined as the carrier for data transmission. For another example, the activated carrier having the lowest or the highest carrier index can be determined as the carrier for data transmission. Since a carrier is associated with a beam, the carrier index can be replaced by beam index. In addition, one or more satellites are associated with the carrier. So, the activated carrier having the lowest or the highest satellite index can be determined as the carrier for data transmission.

In consideration of frequency retuning and TA adjustment, transmission gaps are necessary. The transmission gap (or abbreviated as "gap") may be positioned between two physical resources (e.g. a previous physical resource and a later physical resource). For example, the transmission gap may start at any of the following time points: (1) a time point that is a first duration before the invalidation or expiry of the previous physical resource; (2) the time point on which the previous physical resource becomes invalid or expired; (3) a time point that is a second duration before the validation or activation of the later physical resource; and (4) the time point on which the later physical resource becomes valid or activated. The duration of each transmission gap is determined by the time period necessary for frequency retuning and TA adjustment. The first duration can be the same as or different from the duration of the transmission gap. The second duration is the same as or shorter than the duration of the transmission gap.

Figure 5:
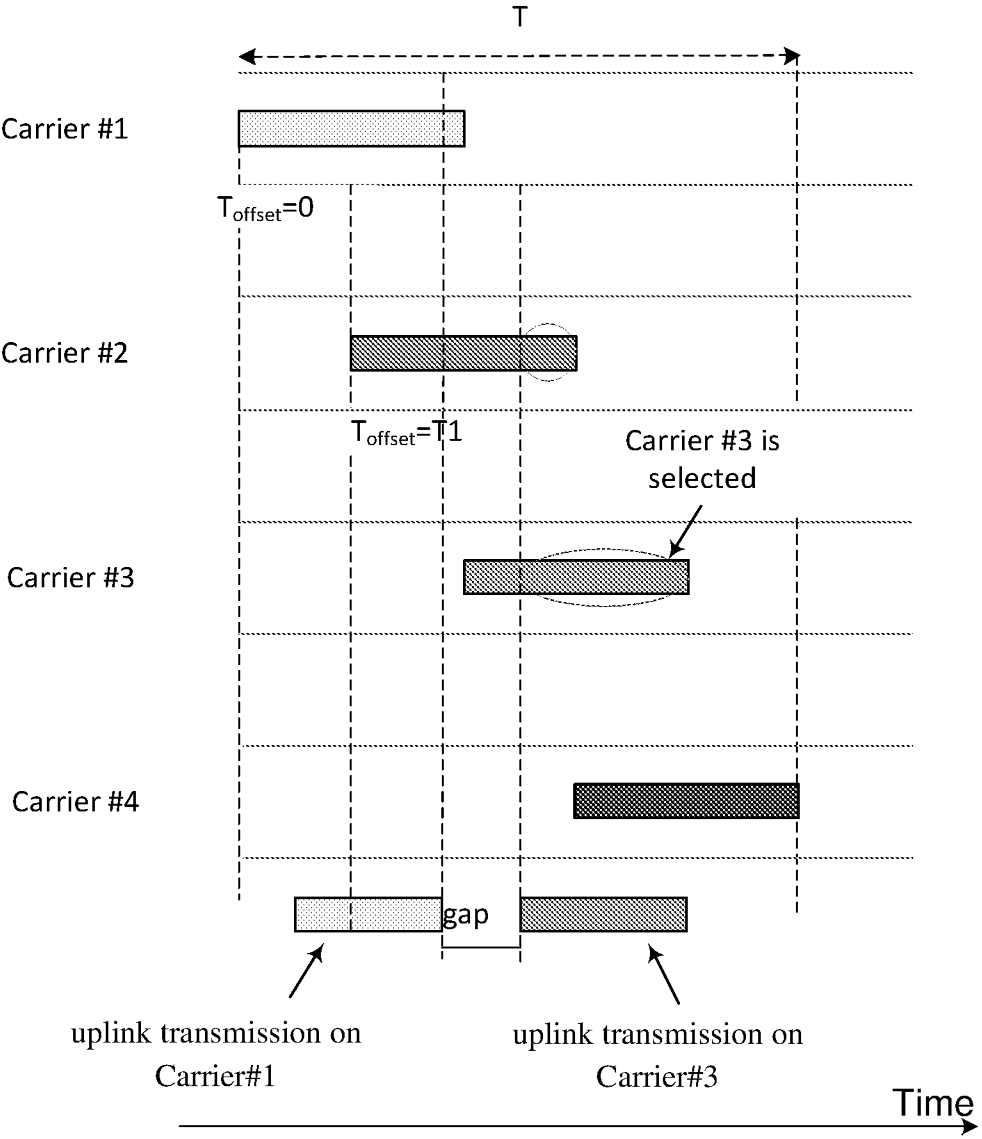
FIG. 5 illustrates an example of carrier selection and transmission gap.

In the example illustrated in FIG. 5, the UE first transmits data on Carrier #1. After a gap (e.g. the gap starting from the time point that is a first duration before Carrier #1 becomes invalid) is configured for frequency retuning and TA adjustment, the UE selects Carrier #3 as the next carrier. Carrier #3 is the activated carrier having the longest remaining satellite activation duration (among activated Carrier #2 and Carrier #3).

In option 2 of the second embodiment. UE is configured with multiple sequential satellites. Each satellite can be represented by a satellite ID or satellite ephemeris.

Each satellite (if represented by a satellite ID) is associated with satellite ephemeris, a satellite activation timer (P), a satellite activation duration (T), an initial TO and a TO drift rate, and further with a carrier configuration. The carrier configuration can be a non-anchor carrier configuration.

The meanings of the satellite ephemeris, the satellite activation timer (P), the satellite activation duration (T), the initial TO and the TO drift rate have been explained in option 1-1.

The carrier configuration means that with which carrier the satellite is associated.

The resource configuration of option 2 of the second embodiment can be also explained with reference to FIG. 3.

The UE is associated with four satellites (e.g. Satellite #1, Satellite #2, Satellite #3, and Satellite #4).

Satellite #1 is associated with P1=10 s, T1=10 s, and with Carrier #1. The satellite ephemeris, the initial TO and the TO drift rate are not shown in FIG. 3.

Satellite #2 is associated with P2=20 s, T2=20 s, and with Carrier #2.

Satellite #3 is associated with P3=40 s, T3=10 s, and with Carrier #1. Satellite #4 is associated with P4=50 s. T4=10 s, and with Carrier #2.

The UE transmits uplink data in the UL carriers corresponding to the satellites sequentially, i.e. Carrier #1 (associated with Satellite #1), Carrier #2 (associated with Satellite #2), Carrier #1 (associated with Satellite #3), and Carrier #2 (associated with Satellite #4).

In option 2, the resource configuration is related to satellites. So, the UE is transparent to transmit or receive data in multiple carriers.

Figure 6:
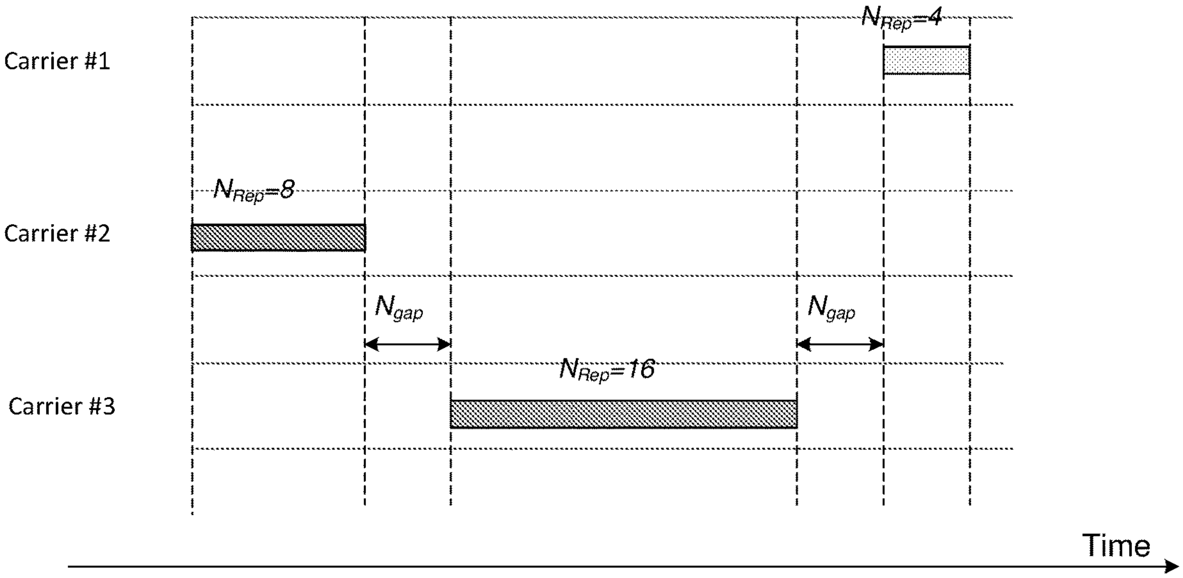
FIG. 6 illustrates an example of a third embodiment.

According to a third embodiment, dynamic transmission resource scheduled via a control signal (e.g. DCI) is considered. The UE is configured with multiple UL carriers for data transmission. Each UL carrier is associated with a carrier ID, a particular beam, a frequency position, and one or more satellites (each satellite can be represented by a satellite ID or satellite ephemeris). In the example of FIG. 6, Carrier #1 is associated with Satellite #1, Carrier #2 is associated with Satellite #2, and Carrier #3 is associated with Satellite #3.

The control signal may include an order of transmission in multiple carriers. For example, in the example of FIG. 6, the order of transmission is Carrier #2, Carrier #1 and Carrier #3. Obviously, if there are N carriers (e.g. N=3), the possible orders of transmission in the N carriers are N !=1*2* . . . *N(=6 if N=3).

If there are only two carriers, it is possible to only indicate the initial carrier for data transmission.

The control signal may include the repetition numbers for each of the carriers. For example, in the example of FIG. 6, the repetition number ($N_{Rep}$) for Carrier #1 is 4, the repetition number ($N_{Rep}$) for Carrier #2 is 8, and the repetition number ($N_{Rep}$) for Carrier #3 is 16.

The order of transmission (or the initial carrier) and the repetition numbers can be jointly included in the control signal. For example, in the example of FIG. 6, the first carrier is Carrier #1 with repetition number ($N_{Rep}$) of 4, the second carrier is Carrier #2 with repetition number ($N_{Rep}$) of 8, and the third carrier is Carrier #3 with repetition number ($N_{Rep}$) of 16.

Transmission gaps ($N_{gap}$) may be configured for frequency retuning and TA adjustment after the transmission in each carrier.

Figure 7:
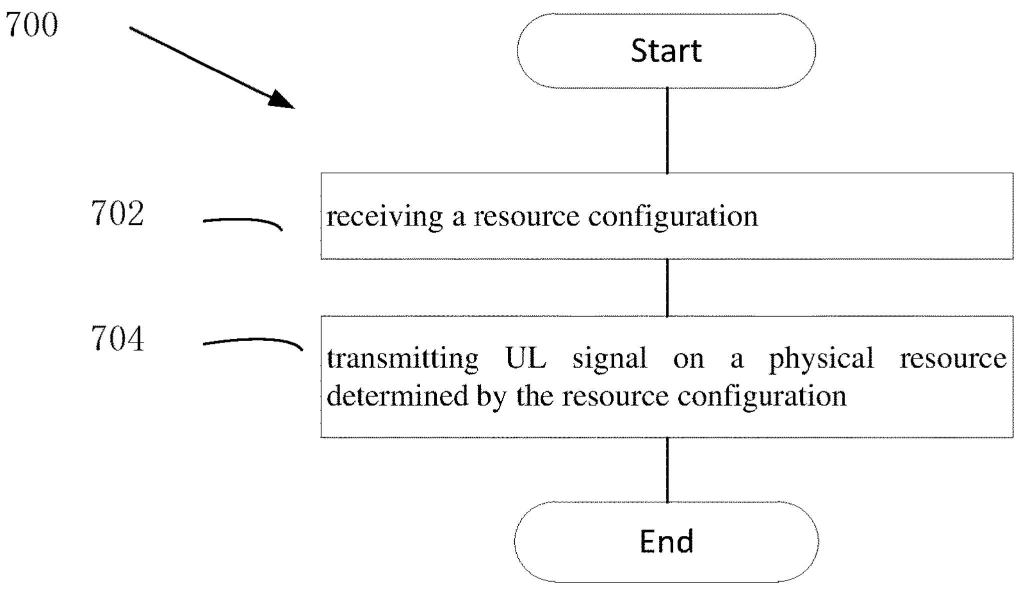
FIG. 7 is a schematic flow chart diagram illustrating an embodiment of a method.

FIG. 7 is a schematic flow chart diagram illustrating an embodiment of a method 700 according to the present application. In some embodiments, the method 700 is performed by an apparatus, such as a remote unit or UE. In certain embodiments, the method 700 may be performed by a processor executing program code, for example, a microcontroller, a microprocessor, a CPU, a GPU, an auxiliary processing unit, a FPGA, or the like.

The method 700 may include 702 receiving a resource configuration; and 704 transmitting UL signal on a physical resource determined by the resource configuration.

In one embodiment, the resource configuration includes multiple carrier configurations, in which each carrier configuration includes at least one of a carrier ID, a beam ID, and a frequency position. Each carrier configuration may further include one or more satellite configurations. Each satellite configuration includes satellite ID, satellite ephemeris, satellite activation timer (P) to a reference time, satellite activation duration (T), satellite initial TO, and TO drift rate. Alternatively, each carrier configuration is associated with a carrier activation starting time (Ts) and a carrier activation duration (N0), and the carrier activation starting time is determined by a carrier activation period (T) and a carrier activation time offset ($T_{offset}$).

In some embodiment, the activated physical resource that has the longest remaining satellite activation duration (T) or carrier activation duration (N0) among multiple activated physical resources is determined as the physical resource. Alternatively, he activated physical resource that has the lowest or the highest carrier index, beam index or satellite index among multiple activated physical resources is determined as the physical resource.

In some embodiment, a transmission gap is inserted in response to the determined physical resource switching. The transmission gap may start at one of the following time points: (1) a time point that is a first duration before the invalidation or expiry of a previous physical resource; (2) the time point on which the previous physical resource becomes invalid or expired; (3) a time point that is a second duration before the validation or activation of a later physical resource; and (4) the time point on which the later physical resource becomes valid or activated.

In another embodiment, the resource configuration includes multiple satellite configurations, wherein each satellite configuration includes satellite ephemeris, satellite activation timer (P) to a reference time, satellite activation duration (T), satellite initial TO, and TO drift rate, and further includes carrier configuration.

In a further embodiment, the method further comprises receiving a control signal including at least one of an order of transmission in multiple physical resources, an initial physical resource, and transmission repetition numbers in the multiple physical resources; and transmitting the UL signal on a physical resource determined by the control signal.

Figure 8:
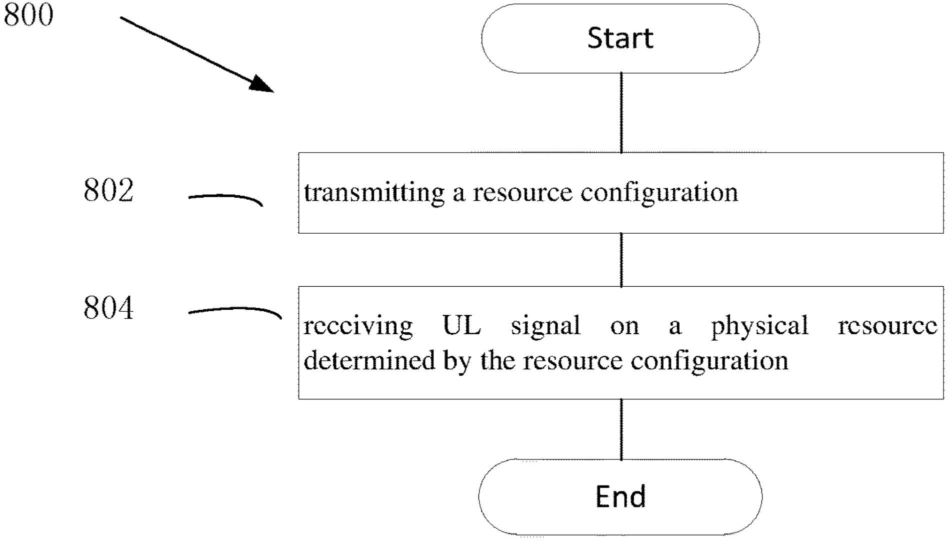
FIG. 8 is a schematic flow chart diagram illustrating a further embodiment of a method.

FIG. 8 is a schematic flow chart diagram illustrating a further embodiment of a method 800 according to the present application. In some embodiments, the method 800 is performed by an apparatus, such as a base unit. In certain embodiments, the method 800 may be performed by a processor executing program code, for example, a microcontroller, a microprocessor, a CPU, a GPU, an auxiliary processing unit, a FPGA, or the like.

The method 800 may include 802 transmitting a resource configuration; and 804 receiving UL signal on a physical resource determined by the resource configuration.

In one embodiment, the resource configuration includes multiple carrier configurations, in which each carrier configuration includes at least one of a carrier ID, a beam ID, and a frequency position. Each carrier configuration may further include one or more satellite configurations. Each satellite configuration includes satellite ID, satellite ephemeris, satellite activation timer (P) to a reference time, satellite activation duration (T), satellite initial TO, and TO drift rate. Alternatively, each carrier configuration is associated with a carrier activation starting time (Ts) and a carrier activation duration (N0), and the carrier activation starting time is determined by a carrier activation period (T) and a carrier activation time offset ($T_{offset}$).

In some embodiment, the activated physical resource that has the longest remaining satellite activation duration (T) or carrier activation duration (N0) among multiple activated physical resources is determined as the physical resource. Alternatively, he activated physical resource that has the lowest or the highest carrier index, beam index or satellite index among multiple activated physical resources is determined as the physical resource.

In some embodiment, a transmission gap is inserted in response to the determined physical resource switching. The transmission gap may start at one of the following time points: (1) a time point that is a first duration before the invalidation or expiry of a previous physical resource; (2) the time point on which the previous physical resource becomes invalid or expired; (3) a time point that is a second duration before the validation or activation of a later physical resource; and (4) the time point on which the later physical resource becomes valid or activated.

In another embodiment, the resource configuration includes multiple satellite configurations, wherein each satellite configuration includes satellite ephemeris, satellite activation timer (P) to a reference time, satellite activation duration (T), satellite initial TO, and TO drift rate, and further includes carrier configuration.

In a further embodiment, the method further comprises transmitting a control signal including at least one of an order of transmission in multiple physical resources, an initial physical resource, and transmission repetition numbers in the multiple physical resources; and receiving the UL signal on a physical resource determined by the control signal.

Figure 9:
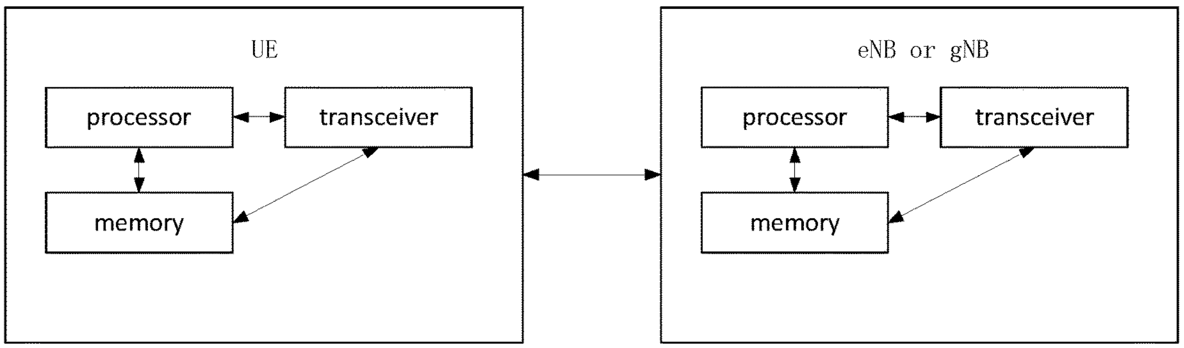
FIG. 9 is a schematic block diagram illustrating apparatuses according to one embodiment.

FIG. 9 is a schematic block diagram illustrating apparatuses according to one embodiment.

Referring to FIG. 9, the UE (i.e. the remote unit) includes a processor, a memory, and a transceiver. The processor implements a function, a process, and/or a method which are proposed in FIG. 7.

The UE comprises a receiver that receives a resource configuration; and a transmitter that transmits UL signal on a physical resource determined by the resource configuration.

In one embodiment, the resource configuration includes multiple carrier configurations, in which each carrier configuration includes at least one of a carrier ID, a beam ID, and a frequency position. Each carrier configuration may further include one or more satellite configurations. Each satellite configuration includes satellite ID, satellite ephemeris, satellite activation timer (P) to a reference time, satellite activation duration (T), satellite initial TO, and TO drift rate. Alternatively, each carrier configuration is associated with a carrier activation starting time (Ts) and a carrier activation duration (N0), and the carrier activation starting time is determined by a carrier activation period (T) and a carrier activation time offset ($T_{offset}$).

In some embodiment, the activated physical resource that has the longest remaining satellite activation duration (T) or carrier activation duration (N0) among multiple activated physical resources is determined as the physical resource. Alternatively, he activated physical resource that has the lowest or the highest carrier index, beam index or satellite index among multiple activated physical resources is determined as the physical resource.

In some embodiment, a transmission gap is inserted in response to the determined physical resource switching. The transmission gap may start at one of the following time points: (1) a time point that is a first duration before the invalidation or expiry of a previous physical resource; (2) the time point on which the previous physical resource becomes invalid or expired; (3) a time point that is a second duration before the validation or activation of a later physical resource; and (4) the time point on which the later physical resource becomes valid or activated.

In another embodiment, the resource configuration includes multiple satellite configurations, wherein each satellite configuration includes satellite ephemeris, satellite activation timer (P) to a reference time, satellite activation duration (T), satellite initial TO, and TO drift rate, and further includes carrier configuration.

In a further embodiment, the receiver further receives a control signal including at least one of an order of transmission in multiple physical resources, an initial physical resource, and transmission repetition numbers in the multiple physical resources; and the transmitter transmits the UL signal on a physical resource determined by the control signal.

Referring to FIG. 9, the eNB or gNB (i.e. base unit) includes a processor, a memory, and a transceiver. The processors implement a function, a process, and/or a method which are proposed in FIG. 8.

The base unit comprises a transmitter that transmits a resource configuration; and a receiver that receives UL signal on a physical resource determined by the resource configuration.

In one embodiment, the resource configuration includes multiple carrier configurations, in which each carrier configuration includes at least one of a carrier ID, a beam ID, and a frequency position. Each carrier configuration may further include one or more satellite configurations. Each satellite configuration includes satellite ID, satellite ephemeris, satellite activation timer (P) to a reference time, satellite activation duration (T), satellite initial TO, and TO drift rate. Alternatively, each carrier configuration is associated with a carrier activation starting time (Ts) and a carrier activation duration (N0), and the carrier activation starting time is determined by a carrier activation period (T) and a carrier activation time offset ($T_{offset}$).

In some embodiment, the activated physical resource that has the longest remaining satellite activation duration (T) or carrier activation duration (N0) among multiple activated physical resources is determined as the physical resource. Alternatively, he activated physical resource that has the lowest or the highest carrier index, beam index or satellite index among multiple activated physical resources is determined as the physical resource.

In some embodiment, a transmission gap is inserted in response to the determined physical resource switching. The transmission gap may start at one of the following time points: (1) a time point that is a first duration before the invalidation or expiry of a previous physical resource; (2) the time point on which the previous physical resource becomes invalid or expired; (3) a time point that is a second duration before the validation or activation of a later physical resource; and (4) the time point on which the later physical resource becomes valid or activated.

In another embodiment, the resource configuration includes multiple satellite configurations, wherein each satellite configuration includes satellite ephemeris, satellite activation timer (P) to a reference time, satellite activation duration (T), satellite initial TO, and TO drift rate, and further includes carrier configuration.

In a further embodiment, the transmitter further transmits a control signal including at least one of an order of transmission in multiple physical resources, an initial physical resource, and transmission repetition numbers in the multiple physical resources; and the receiver receives the UL signal on a physical resource determined by the control signal.

Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:

receiving a resource configuration that includes multiple carrier configurations, each carrier configuration including a carrier ID, a beam ID, or a frequency position and one or more satellite configurations, each satellite configuration including a satellite ID, satellite ephemeris, satellite activation timer (P) to a reference time, satellite activation duration (T), satellite initial timing offset (TO), and a TO drift rate; and transmitting uplink (UL) signal on a physical resource determined by the resource configuration.

2. The method of claim 1, wherein each carrier configuration is associated with a carrier activation starting time (Ts) and a carrier activation duration (N0), and the carrier activation starting time is determined by T and a carrier activation time offset ($T_{offset}$).

3. The method of claim 1, wherein an activated physical resource that has longest remaining T or carrier activation duration (N0) among multiple activated physical resources is determined as the physical resource.

4. The method of claim 1, wherein an activated physical resource that has a lowest or a highest carrier index, beam index or satellite index among multiple activated physical resources is determined as the physical resource.

5. The method of claim 1, wherein a transmission gap is inserted in response to determining switching of the physical resource.

6. The method of claim 1, further comprising:

receiving a control signal, the control signal including at least one of an order of transmission in multiple physical resources, an initial physical resource, or transmission repetition numbers in the multiple physical resources; and transmitting the UL signal on a physical resource determined by the control signal.

7. A user equipment (UE) for wireless communication, comprising:

at least one memory; and at least one processor coupled with the at least one memory and configured to cause the UE to:

receive a resource configuration that includes multiple carrier configurations, each carrier configuration including a carrier ID, a beam ID, or a frequency position and one or more satellite configurations, each satellite configuration including a satellite ID, satellite ephemeris, satellite activation timer (P) to a reference time, satellite activation duration (T), satellite initial timing offset (TO), and a TO drift rate; and transmit uplink (UL) signal on a physical resource determined by the resource configuration.

8. The UE of claim 7, wherein each carrier configuration is associated with a carrier activation starting time (Ts) and a carrier activation duration (NO), and the carrier activation starting time is determined by T and a carrier activation time offset ($T_{offset}$).

9. The UE of claim 7, wherein an activated physical resource that has longest remaining T or carrier activation duration (NO) among multiple activated physical resources is determined as the physical resource.

10. The UE of claim 7, wherein an activated physical resource that has a lowest or a highest carrier index, beam index or satellite index among multiple activated physical resources is determined as the physical resource.

11. The UE of claim 7, wherein a transmission gap is inserted in response to determining switching of the physical resource.

12. The UE of claim 11, wherein the transmission gap starts at one of: a time point that is a first duration before an invalidation or expiry of a previous physical resource; a time point on which a previous physical resource becomes invalid or expired; a time point that is a second duration before validation or activation of a later physical resource; or a time point on which the later physical resource becomes valid or activated.

13. The UE of claim 7, wherein the at least one processor is configured to cause the UE to:

receive a control signal, the control signal including at least one of an order of transmission in multiple physical resources, an initial physical resource, or transmission repetition numbers in the multiple physical resources; and transmit the UL signal on a physical resource determined by the control signal.

14. A base station for wireless communication, comprising:

at least one memory; and at least one processor coupled with the at least one memory and configured to cause the base station to:

transmit a resource configuration that includes multiple carrier configurations, each carrier configuration including a carrier ID, a beam ID, or a frequency position and one or more satellite configurations, each satellite configuration including a satellite ID, satellite ephemeris, satellite activation timer (P) to a reference time, satellite activation duration (T), satellite initial timing offset (TO), and a TO drift rate; and receive uplink (UL) signal on a physical resource determined by the resource configuration.

15. The base station of claim 14, wherein each carrier configuration is associated with a carrier activation starting time (Ts) and a carrier activation duration (NO), and the carrier activation starting time is determined by T and a carrier activation time offset ($T_{offset}$).

16. The base station of claim 14, wherein an activated physical resource that has longest remaining T or carrier activation duration (NO) among multiple activated physical resources is determined as the physical resource.

17. The base station of claim 14, wherein an activated physical resource that has a lowest or a highest carrier index, beam index or satellite index among multiple activated physical resources is determined as the physical resource.

18. The base station of claim 14, wherein a transmission gap is inserted in response to determining switching of the physical resource.

19. The base station of claim 14, wherein the at least one processor is configured to cause the base station to:

transmit a control signal, the control signal including at least one of an order of transmission in multiple physical resources, an initial physical resource, or transmission repetition numbers in the multiple physical resources; and receive the UL signal on a physical resource determined by the control signal.

20. A method performed by a base station, the method comprising:

transmitting a resource configuration that includes multiple carrier configurations, each carrier configuration including a carrier ID, a beam ID, or a frequency position and one or more satellite configurations, each satellite configuration including a satellite ID, satellite ephemeris, satellite activation timer (P) to a reference time, satellite activation duration (T), satellite initial timing offset (TO), and a TO drift rate; and receiving uplink (UL) signal on a physical resource determined by the resource configuration.

* * * * *